MAGNETIC-CORE LOGIC CIRCUITS
Original Filed Jan. 19, 1960 3 Sheets-Sheet 1
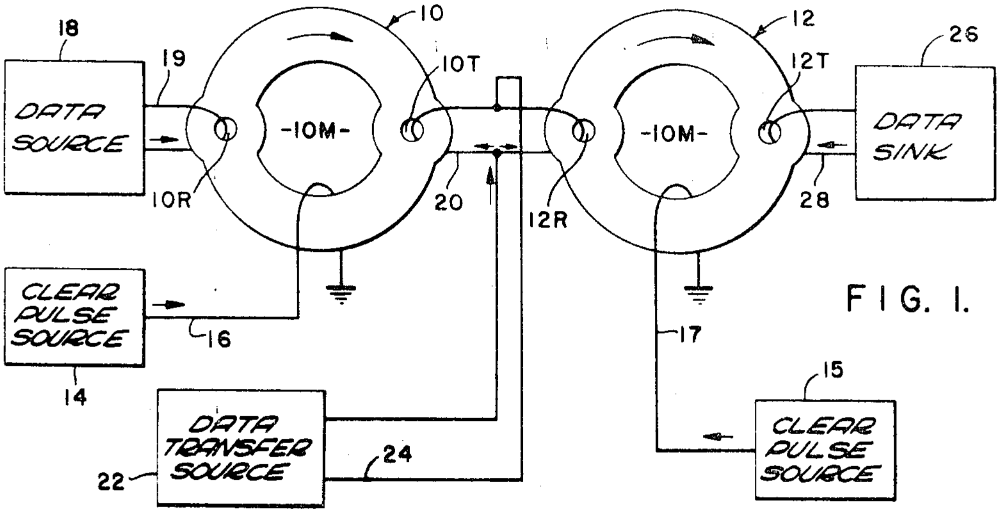
FIG. 1.
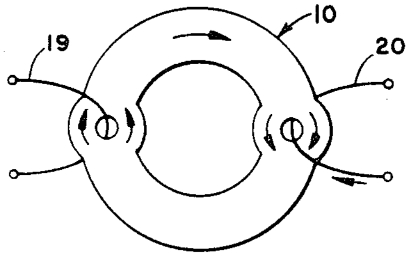
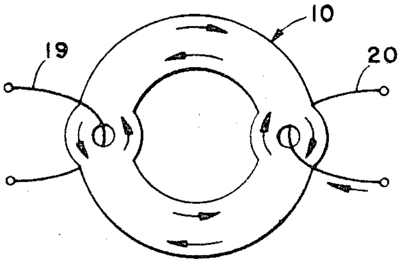
FIG. 2. FIG. 3.
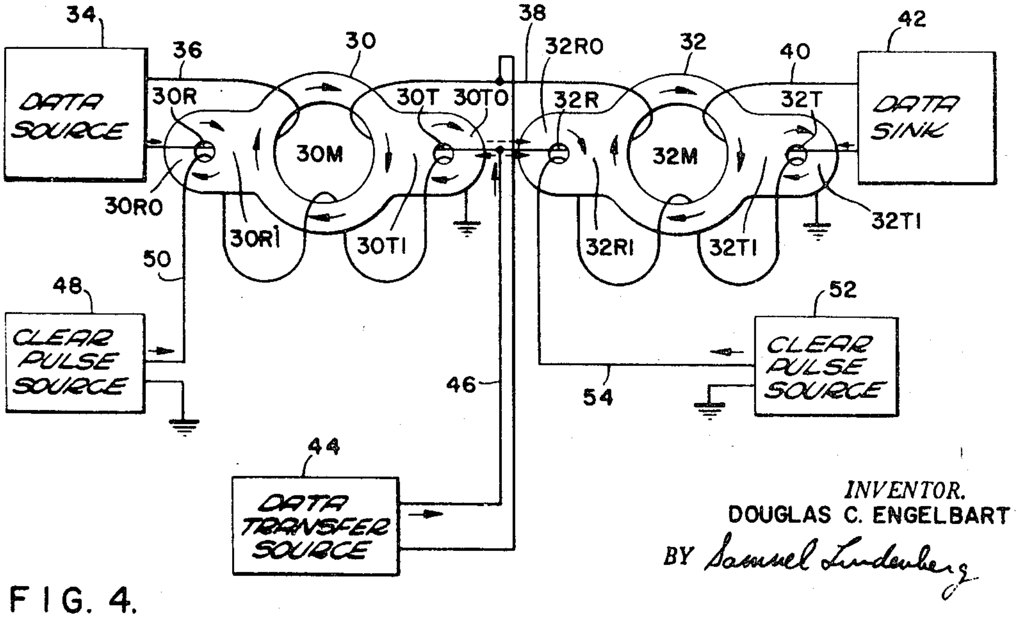
FIG. 4.
INVENTOR.
DOUGLAS C. ENGELBART
BY Samuel Lindenberg
ATTORNEY Dec. 13, 1966 D. C. ENGELBART 3,292,163

MAGNETIC-CORE LOGIC CIRCUITS

Original Filed Jan. 19, 1960 3 Sheets-Sheet 2

INVENTOR.
DOUGLAS C. ENGELBART

ATTORNEY

INVENTOR.
DOUGLAS C. ENGELBART
BY Samuel Lindenberg
ATTORNEY

United States Patent Office 3,292,163

Patented Dec. 13, 1966

3,292,163

MAGNETIC-CORE LOGIC CIRCUITS

Douglas C. Engelbart, Palo Alto, Calif., assignor to AMP Incorporated, Harrisburg, Pa., a corporation of New Jersey Original application Jan. 19, 1960, Ser. No. 3,395, now Patent No. 3,140,402, dated July 7, 1964. Divided and this application Dec. 3, 1962, Ser. No. 241,956
4 Claims. (Cl. 340—174)

This invention relates to magnetic-core systems of the type wherein data is transferred by transferring the state of magnetic remanence of one core to another and, more particularly, to improvements therein.

This application is a divisional application being divided from application Serial No. 3,395, filed January 19, 1960 and now U.S. Patent No. 3,140,402, for Magnetic Core Logic Circuits.

Magnetic cores made of magnetic ferrite material and having the general configuration of a toroid with a central main aperture and one or more smaller apertures in the toroid ring are employed nowadays for many purposes, such as for memory arrangement shift registers, as well as the performance of a logical operation. In performing logical operations, it is oftentimes desirable to provide a complementing operation. This is an operation wherein, for example, a one is read as a zero, and vice versa. The magnetic cores usually employed for logical functions normally have two states of magnetic remanence, one of which represents a zero and the other a one. To perform a complementing operation, a magnetic core which is in its one state of magnetic remanence, upon readout, should indicate a zero-representative signal. The magnetic core which is in its zero state of magnetic remanence, upon readout, should provide a one representative signal.

An object of the present invention is to provide a configuration for a multiaperture magnetic core which enables a complementing operation to be performed.

Another object of the present invention is to provide a magnetic-core configuration whereby an improved logical element is made available.

Yet another object of the present invention is to provide a novel and useful configuration for a multiaperture magnetic core.

These and other objects of the present invention may be achieved by providing a special shaping about the terminal apertures of a multiaperture core, whereby increased utility for performing logical functions is achieved. Such special shaping requires the addition of sufficient magnetic-core material to the portion of the core surrounding the terminal or output aperture to enable changes in the state of magnetic remanence in the material about that aperture, without affecting the state of remanence in the magnetic material around the main aperture of the core, whether or not the core has been driven to its set state.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a schematic diagram of a known arrangement of multiaperture cores shown to assist in an understanding of this invention;

FIGURES 2 and 3 illustrate multiaperture cores with reversed-output windings;

FIGURE 4 shows a circuit utilizing cores shaped in accordance with this invention;

Figure 5:
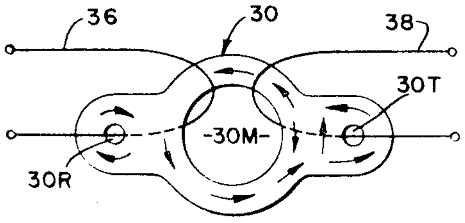
FIGURES 5 and 6 illustrate cores shaped in accordance with this invention, respectively in their set and reset states.

Reference is now made to FIGURES 1, 2 and 3, which are, respectively, a schematic diagram of a prior-art arrangement for transferring data between cores and a representation of different magnetic-core output-winding coupling schemes. These are shown to assist in an understanding and appreciation of the invention. A detailed explanation of the interconnections between cores and the theory of operation thereof may be found in articles such as "A High-Speed Logic System Using Magnetic Elements and Conecting Wire Only," by H. D. Crane, in the Proceedings of the I.R.E., vol. 47, pp. 63 through 73, January 1959. Accordingly, the explanation herein will be rather brief but sufficient to assist in an understanding of the invention.

Two magnetic ferrite cores 10, 12 are shown in FIGURE 1. Each of these cores will have two states of magnetic remanence. Each of these cores has a main aperture 10M, 12M, a receive, or input, aperture 10R, 12R, and a transmit aperture 10T, 12T. Each core has two states of magnetic remanence, one of which will be referred to as the clear state and the other as the set state. When a core is in the clear state, all the flux therein will be considered as circulating in a clockwise direction in the manner represented by the arrow on the core in FIGURE 1, or the arrows on the core in FIGURE 2. It is to be noted that the flux is in the same direction on either side of the receive and transmit apertures of the core at this time. When the core is in its set state of magnetic remanence, there will be some flux in the core which circulates in a counterclockwise direction, as well as some flux which circulates in a clockwise direction. However, the important point to be noted is that, as represented in FIGURE 3 by the arrows on the core, the flux in the material adjacent the receive and transmit apertures is respectively flowing in opposite directions. A core in its clear state will represent the data bit "zero" being stored therein; a core in its set state will represent the data bit "one" being stored therein.

In FIGURE 1 the cores 10, 12 are driven to their clear states by the application of a pulse of current from a clear-pulse source 14 to a clear winding 16, which passes through the main aperture 10M of the core 10. A second clear-pulse source 15 can apply clear current to a clear winding 17, which passes through the main aperture 12M of the core 12. A data source 18 applies a pulse of current to an input winding 19, which is inductively coupled to the core 10 by being passed through its receive aperture 10R. If this current from the data source exceeds a threshold value (representative of a one bit), then the core 10 is driven from its clear state to its set state. If the pulse of current from the data source does not exceed the threshold value (representative of a zero bit), then the core 10 will remain substantially unaffected. The threshold value of current is generally defined as the value which, if exceeded, will cause a flux reversal or change in the state of remanence in the material surrounding the main aperture. The transmit aperture 10T is coupled to the receive aperture 12R of the succeeding core by a transfer winding 20.

In order to transfer the state of remanence of the core 10 to the core 12, a data-transfer source 22 is connected through an advancing winding 24 to the center of each side of the transfer winding 20. The data-transfer source supplies a pulse of current which is equal to twice the threshold value. The current from the data-transfer source divides into two equal parts at first, so that the value of current flowing through the portions of the winding respectively coupled to the transmit aperture 10T and receive aperture 12R is only equal substantially to the threshold value.

If the magnetic core 10 is in the clear state at the time the advancing winding 24 is excited from the data-transfer source, then substantially no change occurs in the magnetic state of the core 10. The reason is that the only change that could occur in response to the current in the transfer winding would be one which reversed flux around the main aperture. Since the current amplitude is below the threshold value or critical level, this cannot occur, and thus the core is substantially unaffected. Since the value of the current passing through the receive aperture 12R of the core 12 also is at the threshold value, the magnetic state of core 12 is substantially unaffected and it remains in its clear state.

Assume now that the data source 18 excites the input winding 19 with a current in excess of the threshold value. This will drive the magnetic core 10 to its set state of remanence, whereby it stores the digit "one." The flux orientation assumed is represented by the arrows on the core shown in FIGURE 3. The application of current at the threshold value to the transmit aperture 10T can cause a flux reversal to take place about that aperture. Less current is required to alter the state of remanence of the core material around a transmit aperture than around a main aperture. Thus when a core is in its set state, a flux reversal can be made to occur about the transmit aperture with a current at the threshold value. Such flux reversal induces a voltage in the winding 20 which has the effect of steering more current from the advancing winding 24 through the receive aperture than will pass through the transmit aperture. This increase in current effectively exceeds the threshold value, as a result of which a flux reversal occurs in core 12 about the main aperture, whereupon core 12 is driven to its set state of magnetic remanence.

A data sink 26 is representative of another core or circuit which will receive the binary bit which has been entered into the core 12 from core 10. The data sink 26 is coupled to the transmit aperture 12T through an output winding 28. The mechanism for deriving the data from the core 12 may be similar to the mechanism just described for transferring data from core 10 to core 12.

The data transfer that has been described thus far is one wherein the output is identical with the input. However, there are many operations in performing logical functions with magnetic cores wherein it is desired to obtain an output which is the complement of the input. Multiaperture cores of the type shown in FIGURE 1 cannot be used for this purpose. FIGURES 2 and 3 show the core 10 with the associated input winding 19 and one-half of the transfer winding 20. However, in FIGURES 2 and 3 the transfer winding 20 is coupled to the core 10 with a sense which is opposite to the coupling shown in FIGURE 1. It will be appreciated that the arrangement shown in FIGURE 1 is one for obtaining output from the core 10 which is identical with the input. The purpose in reversing the output winding is to attempt to obtain an output which is a complement of the input. Assume that the core 10 is in its clear state, as represented in FIGURE 2. The application of a current having the threshold value to the winding 20 only attempts to push the flux in the core in a direction in which it already exists, namely, the direction of saturation, and therefore, has no effect on the flux state of the core. As a result, no voltage is induced in the winding 20 to steer current, and a zero is read out which is exactly the situation as occurred in FIGURE 1 when the core 10 was in the clear state.

In FIGURE 3 a current having threshold value is applied to the transfer winding 20 with the core 10 in the set state. Despite the fact that the core is in its set state, the current in the transfer winding will have substantially no effect on the core, in view of the fact that the drive applied to the core drives the flux around the transmit aperture in the direction in which it is already placed by the drive of the core to the set state. Thus, a complementary output is obtained when the core is in its set state. However, since no complementary output is obtained when the core is in its clear state, the system obviously cannot be used for providing complementary outputs. It should be noted that reversing the winding sense or reversing the direction of current flow in a transfer winding are alternatives and will achieve the same results.

FIGURE 4 is a schematic diagram illustrating an embodiment of the invention. Two magnetic ferrite cores 30, 32, which are shaped in accordance with this invention, each respectively have a receive aperture 30R, 32R, a main aperture 30M, 32M, and a transmit aperture 30T, 32T. Considering now the core 30, the ferrite material between the respective receive and transmit apertures 30R, 30T, and the outer periphery of the core is respectively designated as the receive outer leg 30RO and the transmit outer leg 30TO. The ferrite material which is between the receive aperture 30R and the main aperture 30M is designated as the receive inner leg 30RI. The ferrite material between the transmit aperture and the main aperture 30M is designated as the transmit inner leg 30TI. Similarly, for magnetic core 32, the receiver inner and outer legs are respectively designated as 32RI and 32RO. The transmit inner and outer legs are designated as 32TI and 32TO. In accordance with this invention, the respective receive and transmit apertures or terminal apertures of a core are not positioned so that the cross-sectional area of the inner and outer legs on either side thereof are equal to each other, as well as to the cross-sectional area of the ferrite material where there is no terminal aperture. Instead, more ferrite material is molded on one side of the terminal aperture than on the other, so that the cross-sectional area of the ferrite material on one side of a terminal aperture is twice that on the other side. Thus, the receive inner legs 30RI, 32RI have cross-sectional areas twice that of the receive outer legs 30RO, 32RO. The transmit inner legs 30TI, 32TI have cross-sectional areas twice that of the transmit outer legs 30TO, 32TO. As previously indicated, the purpose of adding the additional material is to enable a change in remanence to occur around the terminal aperture without requiring or effectuating a change in remanence in the material about the main aperture. In an application by Douglas C. Engelbart for Improvement in Magnetic Flux Transfer in Core Systems, Serial No. 849,776, filed October 30, 1959 and now U.S. Patent No. 3,163,854, and assigned to this assignee, there is shown an arrangement for broadening the operating tolerances required for drive currents used to drive an arrangement of cores, such as illustrated in FIGURE 1, by adding magnetic material to the cross-sectional area adjacent the receive aperture of the core. There, however, only sufficient material was added to increase the cross-sectional area an amount less than the cross-sectional area of the toroidal ring at the location where there is no aperture. The additional magnetic material there provided a clipping action, where flux was subtracted from the flux made available for driving a core. This invention, however, distinguishes thereover, both in the arrangement for driving windings, as well as in the requirement that the additional magnetic material be applied in a manner to position the transmit and/or receive apertures unsymmetrically with respect to the cross-sectional area of the material at that region, and, further that the cross-sectional areas of the regions of ferromagnetic material constituting the inner and outer legs have at least a two-to-one ratio.

Data from a data source 34 is applied to an input winding 36, which is coupled to the core 30. The input winding first threads through the aperture 30R and then back to the data source through the main aperture 30M. A transfer winding 38 couples cores 30 and 32 for data transfer. This winding passes first down through the main aperture 30M, then up through the transmit aperture 30T, then down through the receive aperture 30R, and back through the main aperture 32M to form a closed loop. An output winding 40 couples core 32 to a data sink 42. This winding also threads down through the transmit aperture 32T and then back to the data sink through the main aperture 32M. A data-transfer source 44 provides current pulses of effectuate transfer of the data from core 30 to core 32. An advancing winding 46 is connected between the data-transfer source and the centers of both sides of the transfer winding 38. A first clear-pulse source 48 can apply a current for clearing the core 30 to a first clear winding 50. Clear winding 50 is coupled to core 30, first through the receive aperture 30R, then through the main aperture 30M, and finally through the transmit aperture 30T. It should be noted that the winding 50 is coupled in the same sense to all three apertures of the core 30. A second clear-pulse source 52 applies clearing-pulse current to a second clear winding 54. This winding is respectively coupled to the apertures 32R, 32M, and 32T in the same sense.

The flux pattern within the cores 30 and 32, when they are in their clear state, is represented by the arrows drawn on the cores. It is assumed that in the clear state the flux circulates about each one of the apertures in the core in a clockwise direction. This condition is assumed when the clear-pulse source 48 applies a pulse of current to the clear winding 50. Similarly, core 32 is driven to its clear state by the application of a clear pulse from the source 52 to the clear winding 54. Let it be assumed that the clear state of the core represents the storage of a zero data bit and the set state of the core represents the storage of a one data bit. Accordingly, it is not desired to disturb the flux state of a core when a zero data bit is sought to be entered therein. The data source 34 will apply a current to the winding 36, having a value which does not exceed the threshold value. The threshold value of current for the purposes of operating cores of the type shown in FIGURE 4 is one which, when exceeded, will drive a core to its set state. When not exceeded, or when equalled, the flux state of the core will be substantially unaffected.

Assume now that it is desired to enter a zero from the data source 34 into the core 30. Current will be applied to the winding 36, having an amplitude equal to or less than the threshold value, and will flow in the direction designated by the arrow adjacent the winding 36. The flux about the receive aperture 30R will remain unaffected by current flow in view of the fact that the magnetic material is already saturated in the direction toward which it is being driven by the magnetomotive force caused by this current. The flux about the main aperture 30M is also not affected by the flow of current in the winding 36, since the amplitude of this current does not exceed the critical value required to be exceeded in order to reverse the flux direction about the main aperture. Accordingly, the flux condition of core 30 remains substantially unaffected by the transfer thereinto of the zero from the data source. It should also be noted that the flux about the transmit aperture 30T also remains unaffected.

Assume now that it is desired to transfer data from core 30 to core 32. The data-transfer source 44 applies a value of current to the advance winding 46 which is twice the threshold value. This current splits into two equal parts. The portion that passes through the transmit aperture 32 has no effect on the flux about this aperture, since the magnetic material there is saturated in the direction toward which it is being driven by the current flow in the transfer winding 38. Although this current tries to reverse direction of flux about the main aperture 30M, it cannot do so since it does not exceed the threshold value required for reversing flux about the main aperture. The threshold value of current flowing through the receive aperture 32R is in a direction which tends to drive the magnetic material in the direction in which it already is saturated, and thus there is no effect upon the flux condition existing around the receive aperture 32R. Again, although the current flowing in the winding 38 tends to reverse the flux about the main aperture 32M, it cannot accomplish this, since it does not exceed the threshold value. Accordingly, it may be concluded that the core 32 remains in its clear state, and thus represents a zero when the core 30 represents a zero or is in its clear state, despite the application of transfer current to the transfer winding 38.

Let it now be assumed that a current pulse from the data source 34, representing a one, is applied to the input winding 36. This current exceeds the threshold value. However, since the magnetic material around the receive aperture is already saturated in the direction toward which it is being driven by the current in the input winding 36, it is not affected. The flux around the main aperture 30M is reversed by this current. In response to the reversal of flux through the ferrite material around the main aperture, a voltage is induced in the transfer winding 38, in response to which current flows therein. This current has a sufficient amplitude and is in a direction to cause a reversal of flux in the magnetic material around the transmit aperture 30T. The direction of the current flow, in response to this induced voltage, is represented by the dotted arrow adjacent the winding 38. This current flow does not affect the flux in the core 32, since it flows in a direction to drive the flux in the material about the receive aperture 32R in a direction in which that magnetic material is already saturated. This current does not exceed the threshold value, and therefore it cannot reverse the flux condition in the material surrounding the main aperture 32M.

FIGURE 5 is a representation of the magnetic core 30 with arrows thereon illustrating the flux conditions when the core 30 is in the set state. This is the state to which it is driven by the application to the input winding 36 of a current in excess of the critical value. The flux about the receive aperture 30R still circulates in a clockwise direction. The flux about the main aperture 30M circulates in a counterclockwise direction, as does the flux about the transmit aperture 30T.

Assume, now that it is desired to transfer the state of the core 30 into the core 32. The data-transfer source 44 again applies a current pulse to the winding 46 which equals the value of twice the critical, or threshold value. This time the flux about the transmit aperture 30T is reversed, inducing a voltage in the transfer winding 38, which causes the remainder of the current from the data-transfer source to be steered through the receive aperture 32R and the main aperture 32M. The flux condition of the ferrite material about the receive aperture 32R remains the same, since it is already saturated in a direction toward which the current tends to drive. However, the flux in the ferrite material about the main aperture 32M is reversed, since the current flowing in the portion of the winding 38 passing through this main aperture now exceeds the threshold value. In response to the flux reversal about the main aperture 32M, a current is induced in the output winding 40, which is in a direction to cause a flux reversal in the ferrite material about the transmit aperture 32T. As a result, the core 32 is now in its set state, and the flux conditions existing therein are as represented by arrows in FIGURE 5 on the core 30.

Figure 6:
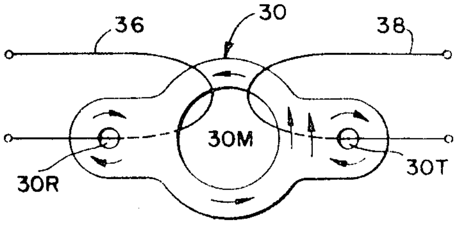

At this time core 30 in FIGURE 4 has the flux conditions represented by the arrows in FIGURE 6. Here, the flux about the receive aperture 30R in FIGURE 6 circulates in a clockwise direction, the flux about the main aperture 30M circulates in a counter-clockwise direction; and the flux about the transmit aperture 30T circulates in a clockwise direction also.

As thus far described, it should be clear that the core 30 transfers to the core 32 whatever data has been entered into the core 30. Thus, the data-handling ability of the arrangement shown in FIGURE 4, as described, is identical with the data-handling ability of the arrangement shown in FIGURE 1. The application of a clear current pulse from the source 48 to the winding 50 only causes a reversal of flux about the main aperture 30, so that it now flows in a clockwise direction. This will induce a voltage in the output winding 38, which causes a current to flow in a direction opposite to that shown by the dotted-line arrow. As far as the transmit aperture 30T is concerned, the effects of this current are overridden by the clear current in the winding 50, and therefore the flux in the material about the transmit aperture 30T is substantially unaffected.

The direction of this induced current flow is such as to tend to reverse the direction of the flux about the main aperture and the receive aperture 32M, 32R, respectively, since the core 32 has been driven to its set state. However, since a smaller magnetomotive force is required to reverse the flux about the receive aperture 32R than about the main aperture 32M, the flux reversal occurs first about the receive aperture 32R. As a result, the flux linkages forced into the coupling loop by the clearing of core 30 are absorbed, at relatively low current, by flux reversing about aperture 32R, and flux about no other aperture of core 32 is disturbed. The magnetic state of core 32 has been changed from the set state, as shown in FIGURE 5 for core 30, only in that flux around the receive aperture is reversed. This new total state of core 32 is called the reset state, but as far as any following circuitry is concerned, core 32 appears still to be in the set condition, and a readout can be derived therefrom in the same manner as a readout was derived from core 30. Thus, the core material about the receive aperture serves the function of protecting a succeeding core against the effects of clearing an immediately preceding core to which it is coupled.

Upon the excitation of winding 40 by the data sink 42 with a current equal to the threshold value, core 32 will be driven to the state shown in FIGURE 6, except that the flux circulation about the aperture 32R is in a counterclockwise direction as a result of the previous clearing of the core 30. Upon the application of a clear pulse from the source 52 to the clear winding 54, a flux reversal will occur in the material about the receive aperture 32R and about the main aperture 32M. The material about the transmit aperture 32T is already in the state toward which the clear-current drive tends to drive it. Voltages which are induced in the transfer winding 38 as a result of the flux reversal occurring about the receive aperture 32R and main aperture 32M oppose one another, and the resultant is insufficient to affect the state of the core 30.

In order to obtain a complementing operation with a core made in accordance with this invention, it is merely necessary to either reverse the sense of the transfer winding coupling to the core 30, while maintaining the same coupling sense on the succeeding core 32, or to maintain the same coupling sense of the winding 38 on the core 30, while reversing the coupling sense to the winding 38 on the core 32, and also while reversing the current direction received from the data-transfer source. One is the equivalent to the other.

Figure 7:
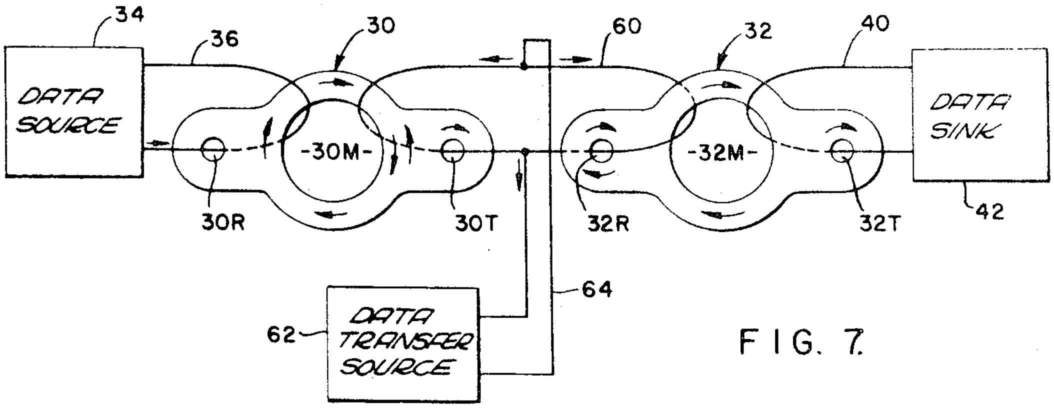
FIGURE 7 shows a circuit and cores in accordance with this invention for obtaining complementary operation.

FIGURE 7 shows a circuit in accordance with this invention for obtaining complementary operation. Similar functioning components in FIGURE 7 bear the same reference numerals as in FIGURE 4. Core 30 is driven by the data source 34 through an input winding 36. Core 32 is coupled to core 30 by a transfer winding 60, which is coupled to the core 30 in the same sense and to the core 32 in an opposite sense to the one shown in FIGURE 4. The output of core 32 is derived by a data sink circuit 42 coupled thereto by an output winding 40. A data-transfer current is derived from a source 62 and is applied to an advancing winding 64. This advancing winding is connected to the centers of the sides of the transfer winding 60. The current from the data-transfer source 62 flows in the direction shown by the arrows adjacent the winding 60. It will be noted that this is the opposite direction to the one assumed in FIGURE 4.

Assume at the outset that the cores 30 and 32 are in their clear conditions. Current from the data-transfer source 62, which is twice the threshold value, is applied over the advance winding 64 to the transfer winding 60. It will be noted that this current flows in a direction opposite to that shown in FIGURE 4. This current has no effect on the state of the flux which exists around the main aperture 30M in the core 30, in view of the fact that it tends to drive to saturation the core material around the main aperture in the direction in which it is already saturated. However, the flux in the material around the transmit aperture 30T is switched or reversed by this current. In response to such flux reversal, a voltage is induced in the winding 60, which steers the remaining current from the data-transfer source into the half of the winding 60, which is inductively coupled to the core 32. This current has no effect on the receive aperture 32R, since the material around this aperture is already saturated in the direction toward which the current is attempting to switch flux. However, the flux is switched around the main aperture. As a result of this, current induced in the output winding 40 reverses the flux around the transmit aperture 32T. It should be apparent that the complement of the zero in the core 30 has been transferred into the core 32.

Assume now that the data source 34 has transferred a one into the core 30, whereby it is put in its set state. The core 32 is in its clear state. A current is provided by the data-transfer source in order to effectuate a transfer of data between the core 30 and 32. The current at the threshold value, which flows down through the main aperture 30M, cannot reverse the flux in the material around the main aperture. The material around the transmit aperture 30T is already saturated in the direction of the drive provided by the current. Therefore, there is no alteration in the flux condition of core 30. Current at the threshold value cannot alter the state of the flux in the material around the main aperture 32M, since the amplitude of the current is too low. The material around the receive aperture 32R already is saturated in the direction of the drive of the current, and thus is not affected. It will be appreciated, therefore, that the complement of the one data bit in core 30 has been transferred into core 32. Therefore, with this invention, it is possible to achieve both a complementing operation, and also an operation in accordance with previously known systems. It should again be emphasized that the complementing operation can either be obtained by simple expedient of reversing the sense of the winding used to derive an output from a core made in accordance with this invention, or by reversing the current flow in said winding while maintaining the sense of the winding coupling a succeeding core properly oriented so that the reversed current flow does not negate the operation desired.

Although the cores 30 and 32 have the outer leg larger than the inner leg on both the receive and transmit sides, this is not a necessary condition for operating the embodiment of the invention. It is within the scope of this invention to provide a core with an outer leg cross-sectional area larger than that of the inner leg. The core will operate just as satisfactorily as the one that has been described to provide the same, or complementing, operation.

Figure 8:
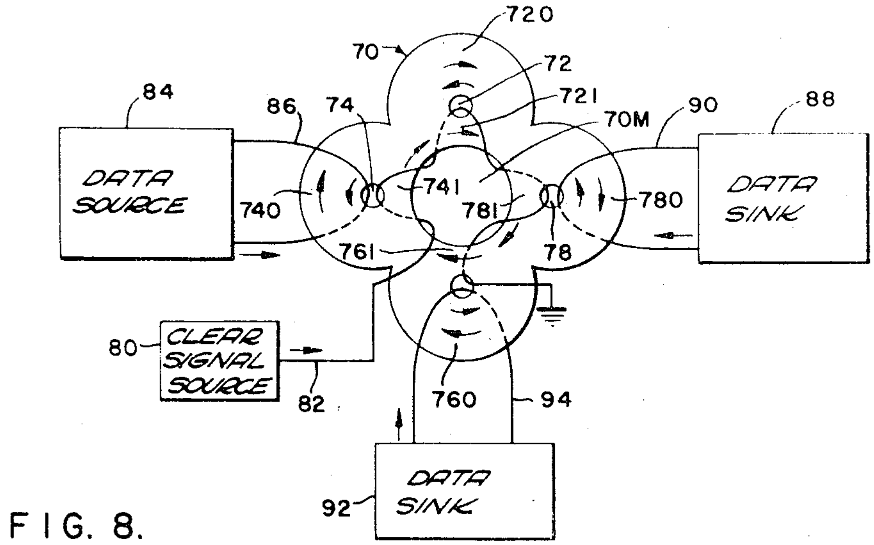
FIGURE 8 shows a core shaped in accordance with this invention to afford a plurality of inputs and/or outputs.

Reference is now made to FIGURE 8 which shows a shaped multiaperture core in accordance with this invention having five apertures, and the outer leg adjacent each one of the terminal apertures larger than the inner leg. The core 70 has a main aperture 70M and four terminal apertures, respectively 72, 74, 76, 78. Any one of these four terminal apertures can be used as either an input or an output aperture, and as an output aperture can be used for providing the complementing operation. Each inner leg 72I, 74I, 76I, and 78I has one-half the cross-sectional area of each outer leg 72–O, 74–O, 76–O, and 78–O. The clear state of the core 70 is represented by the arrows on the core 70 in FIGURE 8. The flux circulates about the main aperture in a clockwise direction, and no net flux circulates about the terminal apertures. The clear state is secured by the application of current from a clear pulse source 80 to a clear winding 82, which is coupled to the main aperture and to each terminal aperture with a sense to secure the indicated flux orientation upon the application of a clear current to said winding 82. Data from a source 84 is applied to an input winding 86, coupled for example, to the aperture 74.

It should be noted that for all embodiments of this invention an input winding, as well as an output winding, is wound around the leg on a core which has the largest cross-sectional area. In FIGURE 4, this is the inner leg, and in FIGURE 8, it is the outer leg. Output may be derived from the core 70, employing the aperture 78 as the transmit aperture, by way of example. The required readout current is provided by the data sink 88, which is coupled to the output aperture 78 with an output winding 90.

As indicated, an output may also be derived from either or both of the apertures 72 and 76, in addition to aperture 78. A data sink 92 is coupled to the aperture 76 through the output winding 94. The excitation of this output winding 94 from the data sink 92, in accordance with the explanation shown in FIGURE 7, can be such as to derive a complementing output from the core 70. Thus, the core may be driven to derive either the same data bit as is stored therein, or its complement, as required. As previously pointed out, the core 70 may be employed in the manner described for FIGURE 4 or FIGURE 7.

Figure 9:
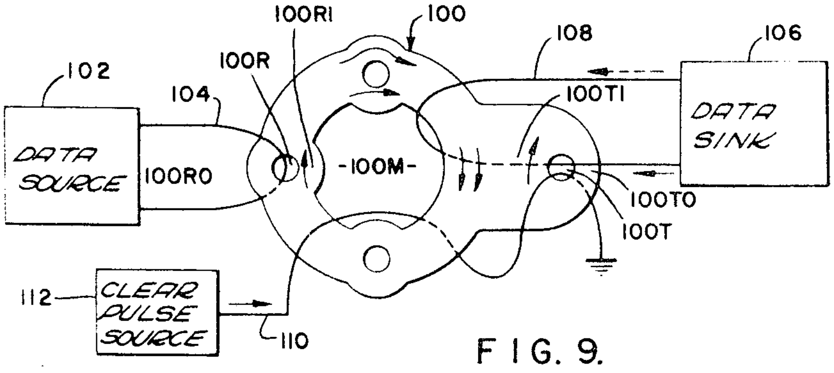
FIGURES 9, 10, and 11 show alternative embodiments of the invention.

FIGURE 9 shows a core shaped in accordance with this invention, whereby the input-shaping of the core is identical with the type of input provided with the prior-art multiaperture cores, but the output is shaped in accordance with this invention. As a result an output can be derived from the core which is the same as the input or its complement. The core 100, shown in FIGURE 9, has a main aperture 100M, a receive aperture 100R, and a transmit aperture 100T. The inner and outer legs, respectively 100RI and 100RO, at the receive aperture have the same cross-sectional area. The sum of these two cross-sectional areas may be made equal to that of the portion of the toroid ring in which there is no aperture. The inner leg 100TI, at the transmit aperture, has three times the cross-sectional area of the outer leg 100TO, which in turn has at least the cross-sectional area of either 100RI or 100RO. Expressed otherwise, the cross-sectional area of 100TI equals at least 100RO+100RI+100TO. A data source 102 is coupled to the receiver aperture 100R by an input winding 104. A data sink 106 is coupled to the transmit aperture by an output winding 108. A clear winding 110 is excited by a clear pulse source 112. The clear winding passes through the main aperture 100M and then through the transmit aperture 100T, with a sense to achieve a clear condition, illustrated by the arrows on the core 100. The clear condition is one in which the flux about the main aperture circulates in a clockwise direction, as well as the flux about the transmit aperture. The reason that the inner leg 100TI is on the order of three times the cross-sectional area of the outer leg 100TO is because such inner leg must provide sufficient material to carry the flux which circulates around the core plus enough additional material to carry the flux which circulates around the transmit aperture, so that both apertures can be used substantially independently. In the cores shown previously, the ratio of the area was two-to-one because only one unit of area was required to carry the flux circulating around the main aperture while another unit of area carries the flux circulating around the output or input aperture. This ratio is determined by the cross-sectional area of the material in the toroid ring portion of the core in which there is no aperture. Data insertion into the core 100 is as described previously.

Figure 10:
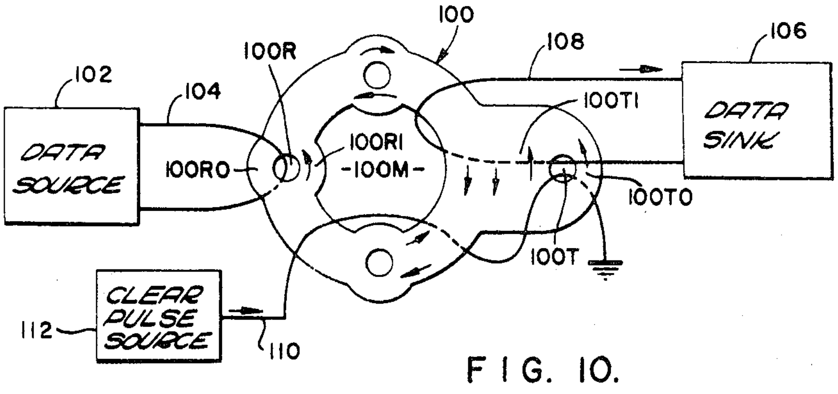

Considering FIGURE 9, if the same output is desired of a core as has been inserted therein, then current is made to flow in the winding 108 in the direction shown by the solid-line arrow. This does not reverse the flux saturation condition around the output aperture 100T when the core 100 is in the clear state. The output that is derived is identical with the input. Thus, current flowing in the direction mentioned does not reverse any flux in the core 100 when it is in the clear state. When the core 100 is in the set state, which is represented in FIGURE 10 by the arrows on the core, then a flux reversal can occur about the output aperture, whereby a voltage is induced in the output winding 108, which can be employed for inserting a one in a subsequent core apparatus, represented here by the data sink 106.

When the complementing operation is desired then current is applied to the output winding 108 in a direction opposite to the one shown. This direction of current flow is represented by the dotted line arrows. Since the level of this current is at or below the threshold value, it will not cause a reversal of flux about the main aperture 100M, but will cause a flux reversal about the output aperture 100T, even though the core 100 is in its clear state. As a result, an output indicative of the complement of the input is achieved. When the core 100 is in its set state, as represented by FIGURE 10, then no alteration of the flux conditions in the core result when the output winding 108 is excited by the current. Thus, the output is the complement of the one state of the core.

Figure 11:
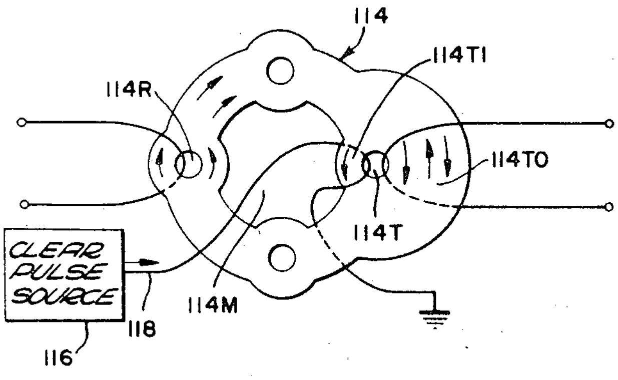

FIGURE 11 shows an alternative shaping of the embodiment of the invention to that shown in FIGURE 9. This is the embodiment of the invention with the greater cross-sectional area being in the outer leg. Thus, the core 114 has a receive aperture 114R and a transmit aperture 114T. The outer leg 114TO, at the transmit aperture, has three times the cross-sectional area of the inner leg 114TI, at the receive aperture. As previously indicated, the reason for this is that the greater cross-sectional area must carry not only the flux which circulates about the main aperture 114M, but also the flux which circulates about the transmit aperture. A clear pulse source 116 applies current to a clear winding 118, to achieve the clear condition of the core wherein the flux orientation is represented by the arrows. The clear winding 118 is coupled through the main aperture and through the transmit aperture with a sense to achieve the flux conditions shown for the clear state. The core 114 can be employed in the same manner previously described for the core shown in FIGURE 9.

There has accordingly been shown and described herein a novel, useful shaping for magnetic cores which not only makes available the same operation as has been heretofore obtained, but also affords a complementing operation whereby the types of apparatus required in logical-circuit arrangements for achieving complementing is minimized and simplified.

I claim:

1. The improvement in toroidal cores of the type made of magnetic material having two states of magnetic remanence and having a main aperture and two terminal apertures in the magnetic material on either side of said main aperture, said improvement comprising having a core with the cross-sectional area of a leg of material on one side of a terminal aperture substantially equaling at least the cross-sectional area of the remaining leg of material adjacent said terminal aperture plus the sum of the cross-sectional areas of the legs of material on either side of the other terminal aperture.

2. A core made of magnetic material having two states of magnetic remanence and having a central main aperture and two terminal apertures in the magnetic material on both sides of said main apertures, the continuous cross-sectional area of a leg of material on one side of one terminal being substantially equal to at least the cross-sectional area of a remaining leg of material adjacent said terminal aperture plus the sum of the cross-sectional areas of the legs of material on both sides of the other terminal aperture.

3. A core of magnetic material as recited in claim 2 wherein said cross-sectional area of said leg of material on one side of said one terminal aperture is between said one terminal aperture and said main aperture.

4. A core of magnetic material as recited in claim 2 wherein said cross-sectional area of said leg of material on one side of said one terminal aperture is between said one terminal aperture and the periphery of said core.

No references cited.

BERNARD KONICK, *Primary Examiner.*

J. MOFFITT, *Assistant Examiner.*